United States Patent [19]

Preston

[11] 3,889,036

[45] June 10, 1975

[54] THEIC-HYDANTOIN-ESTER RESINS FOR WIRE COATINGS

[75] Inventor: Jerome A. Preston, Angola, Ind.

[73] Assignee: Essex International Inc., Fort Wayne, Ind.

[22] Filed: May 9, 1974

[21] Appl. No.: 468,517

Related U.S. Application Data

[60] Division of Ser. No. 402,977, Oct. 3, 1973, Pat. No. 3,835,121, which is a continuation-in-part of Ser. No. 275,922, July 18, 1972, Pat. No. 3,779,991, which is a continuation-in-part of Ser. No. 58,173, July 24, 1970, Pat. No. 3,681,282.

[52] U.S. Cl. .................... 428/383; 260/77.5 NC; 260/DIG. 34; 428/424
[51] Int. Cl. .................. H01b 3/42; C08g 22/08
[58] Field of Search ............... 117/218, 161 K, 232; 260/77.5 NC, DIG. 34

[56] References Cited
UNITED STATES PATENTS

| | | |
|---|---|---|
| 3,211,585 | 10/1965 | Meyer et al. ............... 117/161 K X |
| 3,220,882 | 11/1965 | Lavin et al. ............... 117/218 |
| 3,342,780 | 9/1967 | Meyer et al. ............... 117/132 B X |
| 3,397,253 | 8/1968 | Merten et al. ............ 260/77.5 NC X |
| 3,428,486 | 2/1969 | George ............... 117/218 |
| 3,493,413 | 2/1970 | Olson et al. ............... 117/232 X |
| 3,642,524 | 2/1972 | Merten et al. ............ 117/232 X |
| 3,737,432 | 6/1973 | George et al. ............ 260/77.5 NC X |

Primary Examiner—Ralph Husack
Attorney, Agent, or Firm—Molinare, Allegretti, Newitt & Witcoff

[57] ABSTRACT

Resin composition useful as a wire coating comprising the reaction product of a reactive hydantoin based compound, a polycarboxylic acid, and tris (2-hydroxyethyl) isocyanurate. The resin provides a low cost, cured enamel for electrical conductors. Preferably, the resin composition includes another polyhydric alcohol such as ethylene glycol to impart flexibility.

8 Claims, No Drawings

3,889,036

THEIC-HYDANTOIN-ESTER RESINS FOR WIRE COATINGS

CROSS REFERENCE TO RELATED APPLICATIONS teachings

This is a division of application Ser. No. 402,977, filed Oct. 3, 1973, now U.S. Pat. No. 3,835,121, which application is a continuation-in-part of Ser. No. 275,922, filed July 18, 1972, now U.S. Pat. No. 3,779,991, which in turn, is a continuation-in-part of earlier application, Ser. No. 58,173, filed July 24, 1970, now U.S. Pat. No. 3,681,282, the teachings of which are incorporated by reference herein.

BACKGROUND OF THE INVENTION

This invention relates to novel polyester materials containing hydantoin radicals and isocyanurate radicals in the polymeric backbone.

There has been a continuing demand for an improved magnet wire enamel coating which possesses good electrical insulating properties, resistance to heat and solvent attacks, and other desirable properties. U.S. Pat. Nos. 3,211,585 and 3,342,780, disclose examples of such a polyester enamel for magnet conductors when these properties are obtained by utilizing the reaction product of a polycarboxylic acid and tris (2-hydroxyethyl) isocyanurate (THEIC).

These THEIC based resins are used for high temperature applications and have a high cost which is often prohibitively expensive. Thus, less expensive substitutes and partial substitutes for THEIC are desirable. For example, aliphatic polyhydric alcohols such as ethylene glycol or glycerine are often used as a partial substitute for THEIC for purposes of economy. The resultant resin has lesser quality, but is commercially acceptable because it has a lower cost.

Accordingly, it is an object of the present invention to provide a novel enamel coating for magnet wires less expensive than the THEIC based resins but having substantially equivalent properties in comparison to THEIC resins.

It is another object of this invention to provide an economic substitute for THEIC that provides a superior product when compared to the aliphatic polyhydric alcohol substituted THEIC polyesters.

It is a specific object of this invention to substitute at least a portion of the ethylene glycol in a THEIC based resin with a reactive hydantoin compound to improve resin properties.

Further objects of the invention will become apparent to those skilled in the art from a reading of the following description.

SUMMARY OF THE INVENTION

In accordance with the present invention, there is provided a new magnet wire coating which comprises a polymer containing both hydantoin rings and isocyanurate rings in the backbone.

As used herein, isocyanurate ring or radical as derived from THEIC refers to the radical

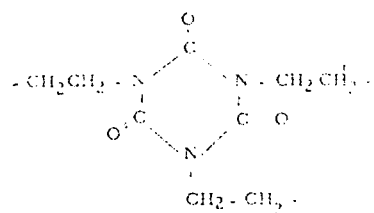

as it appears in the polymer backbone.

In particular, the preferred novel polymers of the present invention having hydantoin and isocyanurate radicals in the resin backbone are the reaction product of a monomeric or polymeric compound containing a hydantoin radical and having reactive —OH, —H, —COOH, alkoxy, and —NH$_2$ groups and equivalents thereof; an aromatic carboxylic acid having at least two carboxy groups or an anhydride, ester, chloride of said acid and THEIC. In a more limited preferred embodiment up to 50 equivalent percent of the THEIC is replaced by another polyhydric alcohol such as ethylene glycol.

Thus, the novel polymers of the invention may be prepared by reacting THEIC, the carboxylic acid, and the reactive-hydantoin radical containing compound. These reactions are affected by means known to the art. Preferred are reaction temperatures of about 150°C. to about 280°C. and reaction times of about 4 hours to 24 hours.

DESCRIPTION OF THE PREFERRED EMBODIMENTS

As indicated, the novel polymers of the present invention are obtained by reacting a reactive hydantoin radical containing compound, a carboxylic acid and THEIC.

The preferred reactive hydantoin compounds are monomeric reactive hydrantoin compounds represented by the formula:

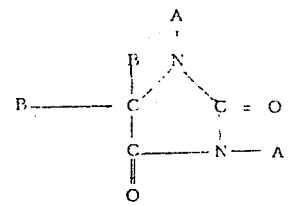

To provide a hydantoin radical defined as

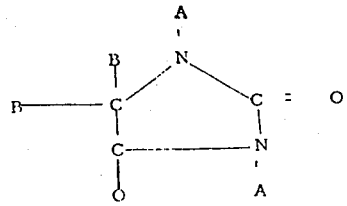

in the polymer backbone wherein
A is H, OH, ROH, COOH, RCOOH, —NH$_2$, RNH$_2$ or (OR)$_x$OH wherein R is (CH$_2$)$_y$ and y is 1-5, x is an integer in the range of 1 to 10, R$_1$-O-R$_2$ where R$_1$ and R$_2$ are C$_1$-C$_5$ alkyl groups, and B is H, OH, ROH, COOH, RCOOH, NH$_2$, RNH$_2$, or a C$_1$-C$_{10}$ alkyl group.

Typical reactive hydantoin monomers are diphenyl hydantoin, dimethyl hydantoin, diethyl hydantoin, mono methylol dimethyl hydantoin, (dimethyl hydantoin methyl)$_3$ amine, methylene bis dimethyl hydantoin, dicarboxydiethyl 5,5'dimethyl hydantoin, diamino dipropyl 5,5' dimethyl and dihydroxydiethyl 5,5' dimethyl hydantoin. These monomers can be obtained from Glyco Chemicals, Inc., Greenwich, Conn. A particularly preferred hydantoin 1,3-dihydroxyethyl, 5,5' dimethyl hydantoin.

The reactive hydantoin compound can be prepared, in an alternative embodiment, by reacting HCN and a diisocyanate, reacting N-phenylglycine esters with phenylisocyanate or by reacting a glycine with a polyisocyanate, a polyisothiocyanate or a polyamine.

While the previously described monomers are preferred, it is also within the scope of this invention to utilize dimers and trimers of these monomers. Preferably, the hydantoin comprises about 5 percent to about 50 percent by weight of the composition and affects a partial substitution for THEIC without materially adversely affecting the properties of the resin. Preferably, the THEIC comprises about 5 percent to about 50 percent by weight of the composition.

The last method indicated for making a reactive hydantoin-containing component herein and the glycine derivatives which are suitable are disclosed in the Merten et al U.S. Pat. No. 3,397,253. It may be stated generally such glycine derivatives are prepared by the reaction of an aromatic polyamine with a haloacetic acid. Representative examples of such glycine derivatives are: N,N'-bis-carbethoxymethyl-4-4' diamino diphenyl methane; N,N'-bis-carbethoxymethyl-4-4' diamino diphenyl ether.

Preferred glycine derivatives for this embodiment are compounds of the general formula:

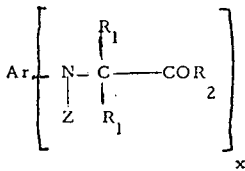

wherein Ar represents an aromatic radical, Z represents hydrogen or $COR_3$, $R_1$ represents hydrogen or alkyl, $R_2$ represents the hydroxyl group or an amino group, an alkylamino-, dialkylamino-, alkoxy-, or aroxy group and x is an integer between 2 and 4. $R_3$ represents a dialkylamino group, an alkoxy group or an aroxy group. the glycine derivatives used according to the invention should contain the radical

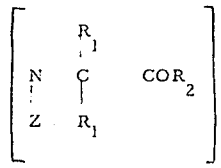

at least twice in the molecule.

The aromatic radical Ar is preferably a radical derived from benzene, azobenzene, naphthalene, anthracene, diphenyl, triphenylmethane, a diphenylalkane, a diphenylalkene, diphenylether, diphenylthioether or a polyphenylether. These radicals may also be substituted once or several times, for example, by alkyl-(methyl-) halogen-(chloro-), nitro-, alkoxy-(methoxy-), dialkylamino-(dimethylamino-). acyl-(acetyl-), carbalkoxy-(carbomethoxy or -ethoxy) and cyano groups. Benzene-, naphthalene-, diphenylmethane- and diphenylether derivatives which may be substituted once or twice by methyl groups and/or chlorine atoms are preferred.

The preparation of the glycine derivatives used as starting materials is known and may, for example, be carried out by direct reaction of aromatic polyamines with haloacetic acids or derivatives thereof or by condensation with hydrocyanic acid and aldehydes or ketones, followed by conversion of the nitrile group, into for example, carboxylic acid, ester or amide.

The reaction of aromatic polyamines with haloacetic acid or its derivatives is carried out in an organic solvent, e.g., in ethanol, methanol, acetone, benzene or in an aqueous medium with the use of acid binding agents such as tertiary amines (e.g. pyridine, triethylamine), excess starting amine, soda, potash, sodium bicarbonate, potassium bicarbonate, sodium hydroxide, potassium hydroxide, calcium oxide or calcium carbonate.

Suitable haloacetic acids or derivatives thereof are, for example, chloroacetic acid, chloroacetamide, N,N-dialkylchloroacetamide (alkyl being preferably methyl, ethyl, butyl), chloroacetic acid esters (e.g. methyl, ethyl, phenyl esters),α-chloropropionic acid esters and α-chloropropionic acid.

Another method consists in condensing aryl polyamines with cyanides (e.g. NaCN, KCN) and oxo compounds (e.g. formaldehyde, acetone, acetophenone) with addition of acids; the nitriles obtained can then be saponified in known manner to form carboxylic acids or converted directly into esters by means of alcoholic hydrochloric acid. Other processes consist in modifying glycine derivatives already prepared, e.g. by esterification of the free acids or aminolysis of the esters.

Suitable aromatic polyamines for use in the invention are compounds having at least two amino groups bound to aromatic nuclei although these must not be arranged in the o- or peri-position. Furthermore, the amines may be substituted in any way desired. Examples of such aromatic polyamines are the following:
  m- and p- phenylene diamine,
  2,4-, 2,5- and 2,6-toluylene diamine,
  diisopropylbenzene diamines,
  1,3,5-triaminobenzene,
  2,4,6-triaminotoluene.
  4,4'-diaminoazobenzene.
  2,4,6-triaminoethylbenzene,
  1,3,5-triiospropylbenzene-diamines,
  2-chloro-1,4-phenylene diamine,
  2,5-dichloro-1,4-phenylene diamine,
  2,6 dichloro-1,4-phenylene diamine, 2,6-diamino- and 4,6-diamino-5-methyl-1,3-diethyl-benzene,
  1,3-, 1,4-, 1,5-, 1,6-, 1,7-, 2,4-, 2,5-, 2,7- and 2,8-diaminonaphthalene,
  1,4-diaminoanthraquinone,
  1,5-diaminoanthraquinone,
  4,4'-and 2,4'-diamino diphenyl methane
  4,4'- and 2,4'-diamino-diphenyl ether,
  4,4'- and 2,4'-diamino-diphenylthioether,
  4,4'-diamino-diphenyldisulfide,
  4,4'-diamino-diphenyl,
  4,4'-diamino-3,3'- or -2,2'-dichlorophenyl,
  4,4'-diamino-3,3'-dialkoxy-diphenyl,
  4,4'-diamino-3,3'-dimethyl-diphenyl,
  4,4'-diamino-diphenylmethane,
  2,2-bis-p-aminophenyl-propane,
  1,2-bis-p-aminophenyl-ethane,
  4,4'-diamino-stilbene,
  4,4'-diamino-azobenzene, 4,4'-diamino-diphenylsulfon,
4,4',4''-triamino-triphenylmethane,
diamino-carbazole,
2,2''-dichloro-4,4''-diaminotriphenylether and
2,4-diamino-6-phenyl-(1,3,5)-triazine.
High molecular weight compounds containing several aromatically bound amino groups e.g. aniline formaldehyde resins, may also be used.

Suitable polyisocyanates and polyisothiocyanates to be hated with the glycine derivatives are, for example, aliphatic, cycloaliphatic or aromatic compounds having at least two NCO- or NCS-groups in the molecule. The following are examples of such polyisocyanates: Polymethylene diisocyanates of the formula OCN-(CH$_2$)$_n$-NCO wherein $n$ is a number from 4 to 8, benzene diisocyanates which may be substituted with alkyl groups, for example $m$- and $p$- phenylene diisocyanates, toluylene-2,4- and -2,6-diisocyanate, ethylbenzene-diisocyanates, di- and tri-isopropyl benzene diisocyanates, chloro-p-phenylene diisocyanates, diphenylmethane diisocyanates, naphthalene diisocyanates, ester isocyanates such as triisocyanato-aryl-phosphoric ester and- thioester, glycol-di-p-isocyanatophenyl ester, 4,4'-diisocyanato-diphenylether, 1,2-bis-p-isocyanatophenylethane and 4,4'-diisocyanato-stilbene. Partially polymerized isocyanates having isocyanaurate rings and free NCO groups may also be used.

The polyisocyanates may also be used in the form of their derivatives, e.g. the reaction products with phenols, alcohols, amines, ammonia, bisulphite, HCl etc. Individual examples of these are phenol, cresols, xylenol, ethanol, methanol, propanol, isopropanol, ammonia, methylamine, ethanolamine, dimethylamine, aniline and diphenylamine. Relatively high molecular weight addition products, e.g. of polyisocyanates with polyalcohols such as ethylene glycol propylene glycol, trimethylolakanes or glycerol may also be used.

Instead of the polyisocyanates mentioned, the corresponding thio compounds may be used as well.

The process is generally carried out by heating the two starting components for some time in an organic solvent, the polymer produced remaining in solution. The polymer can be isolated by distilling off the solvent. The quantities of starting compounds may be so chosen that 0.5 to 10 mols of isocyanate or isothiocyanate groups are available per mol of NH$_2$ groups, and it is preferable to use 1 to 3 mols of isocyanate or isothiocyanate. Suitable solvents for the process are compounds which are inert to NCO-groups, e.g. aromatic hydrocarbons, chlorinated aromatic hydrocarbons, aliphatic hydrocarbons, esters and ketones.

Especially suitable are N-alkylpyrrolidones, dimethylsulphoxide, phenol, cresol and dimethylformamide. Where iso (thio) cyanate derivatives are used, other solvents, such as alcohols or phenols, may also be used. On the other hand, it is also possible to react the components together directly without the use of so'vent.

The reaction times vary between 30 minutes and several days and may in special cases lie abovr or below these limits. The reaction temperatures are chosen to be between 0 and 500°C., depending on the starting material.

It is preferred to work at 20° to 350°C., the best results being obtained in the region of 20° to 230°C.

The condensation reactions may be accelerated by the use of catalysts, e.g. metal alcoholates or tertiary amines.

In the polymerisation there takes place, in addition to the condensation of the two reactants, a ring closure reaction to form the hydantoin ring, as can be represented by the following reaction equation:

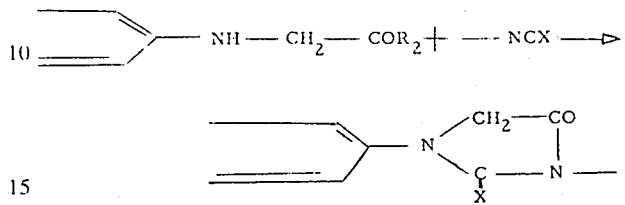

A hydantoin polymer used in this invention can contain the recurring unit

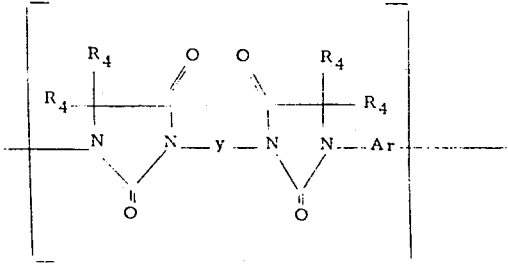

wherein Ar corresponds to the definition already given, R$_4$ represents hydrogen and alkyl having 1 to 6 carbon atoms and y is Ar and additionally alkyl having 4 to 10 carbon atoms (one or more of which may be replaced by oxygen and sulfur) and xylylene. This removing unit may be contained in the polymer about 20 to 5000 times or more.

In another process for preparing the hydantoin polymers, derivatives of N-carboxy-glycine compounds are heated with polyamines to temperatures between 80° and 500°C. This heating may also be carried out in an organic solvent.

Preferred are N-carboxy-glycine derivatives of the general formula

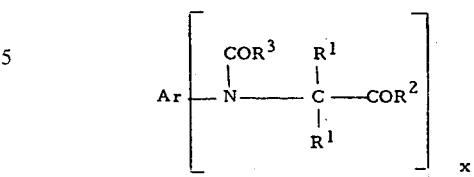

wherein Ar stands for an aromatic radical, R$_1$ is hydrogene or alkyl, R$_2$ is OH, an amino group, an alkylamino group, a dialkylamino group, an alkoxy group or an aroxy group, R$_3$ represents a dialkylamino group, an alkoxy group or an aroxy group and x is an integer between 2 and 4.

Thus, the glycine derivatives to be used should contain the radical

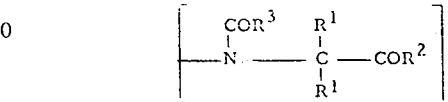

at least twice in the molecule.

The aromatic radicals Ar are preferably the radicals derived from benzene, azobenzene, naphthalene, anthracene, triphenylmethane, diphenylmethane or diphenylether. These radicals may carry one or several substituents for example alkyl-(methyl-), halogen-(chloro-), nitro-, alkoxy-(methoxy-), dialkylamino-(dimethylamino-), acyl-(acetyl-), carbalkoxy-(carbomethoxy- carboethoxy-) and cyano groups. It is advantageous to use the benzene, naphthalene, diphenylmethane or diphenylether derivatives which may be substituted, once or twice, by methyl and/or chloro functions. The glycine derivatives to be used as starting materials are prepared according to known methods. By the direct reaction of the corresponding aromatic polyamines with hydrocyanic acid and aldehydes or ketones and subsequent conversion of the nitrile group into the desired carboxyl function, for example carboxylic acid ester or amide or by condensation of the aromatic polyamines with haloacetic acid or derivatives thereof, there are obtained glycine derivatives having a free NH-function which can subsequently be converted into the desired starting materials by means of chlorocarbonic acid alkylester or chlorocarbonic acid arylester. The reaction with the halogen acetic acid or derivatives thereof as well as the chlorocarbonic acid derivatives proceeds in the sense of a Schtten-Baumann reaction, for example in an organic solvent such as ethanol, methanol, acetone or benzene, or in an aqueous medium with the simultaneous use of an acid acceptor, for example a tertiary amine (pyridine, triethylamine), excess starting amine, sodium carbonate, potassium carbonate, sodium hydroxide, potassium hydroxide, calcium hydroxide or calcium carbonate.

This procedure is essentially the same as already described.

The following condensation with chlorocarbonic acid alkylesters or chlorocarbonic acid arylesters, for example chlorocarbonic acid methyl-, ethyl-, propyl-, -phenyl- or tolyester, is carried out under substantially equal conditions. It is possible to successively combine several processing steps in one reaction step, for example, condensation reactions with chloroacetic acid derivatives and chlorocarbonic acid derivatives. Another method for the preparation of the glycine derivatives comprises condensing the corresponding carbamic acid esters having a free NH— group with a chloroacetic acid derivative, in general via the salt of the carbamic ester.

The thus obtained polyfunctional glycine derivatives containing at least twice the group

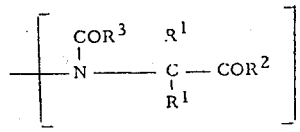

are reacted at elevated temperature with a primary polyamine, i.e. a compound having at least two primary amino groups, yielding the polyhydantoins. The reaction can be represented for example by the following formula

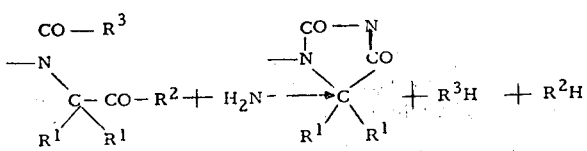

Suitable polyamines for the reaction with the above described glycine derivatives are for example aliphatic, cycloaliphatic and in particular aromatic compounds containing at least two primary amino groups in the molecule. As examples for these polyamines there are mentioned a, w-diaminoalkanes having two to eighteen carbon atoms in the molecule, such as ethylene diamine, propylene diamine-1,2 and 1,3 1,4-diaminobutane, hexamethylene diamine, and octamethylene diamine, besides their alkyl substitution products and polymers, such as trimethyl-hexamethylene diamine, diethylene triamine, triethylene tetramine or dipropylene triamine, aminomethyl group-containing aromatics such as 1,3- or 1,4-xylylene diamine as well as the aromatic polyamines mentioned with reference to the preparation of the glycine derivatives.

The compunds are generally formed by heating the two components, preferably, in stoichiometric quantities to elevated temperature in order to effect the aminolysis represented by the above equation. This reaction is preferably carried out, at least towards the end of the reaction, in the presence of an aromatic solvent. Suitable solvents for this purpose are inert organic solvents such as aliphatics, aromatics, halogen hydrocarbons, in particular N-alkylpyrrolidones, dimethylformamide, dimethylacetamide, dimethylsulfoxide, phenol and cresols.

The condensation of the components is in general effected within the range between 100° and 350°C. preferably between 140° and 200°C., by preparing, first in the absence of a solvent, a pre-condensation product the molecular weight of which is increased as the reaction progresses at elevated temperature. The condensation reaction can be activated by the use of an acidic, an alkaline or a metal catalyst (sodium carbonate, sodium hydroxide solution, endoethylene piperazine, triethylamine, phosphoric acid, p-toluene sulfonic acid, sodium phenolate, lead oxide or titanium tetrabutylate).

The condensation degree of the resulting polymers containing several hydantoin groups in the molecule is determined by the choice of the quantitative ratio of the glycine derivative and the amino component as well as by the reaction conditions. Polymers of high molecular weight i.e. about above several thousand can immediately be taken up in a solvent at the end of the condensation or after the desired condensation degree ha been achieved.

Particularly suitable are polycondensates containing hydantoin or thiohydantoin rings, which are linked through their nitrogen atoms by bivalent organic groups, such as alkylene groups containing 4 to 10 carbon atoms, phenylene groups, toluylene groups, diphenylene groups and diphenylether groups.

Although not essential, additional flexibility can be imparted to the final resin reaction product by the addition of a polyhydric alcohol in an amount up to 50 equivalent weight percent of the THEIC, and preferably in the amount of about 1% to about 10% by weight of the final product. Suitable polyhydric alcohols include both glycols and polyols.

The glycol employed can vary widely. In general, they are the glycols conventionally employed in preparing polyesters. Suitable examples include alkylene glycols of the formula $H(OA)_n OH$ where $n$ is, for example, 1–10 or higher and A is alkylene, such as ethylene, propylene, butylene, etc., for example, ethylene glycol, diethylene glycol, propylene glycol, dipropylene glycol, tripropylene glycol, triethylene glycol, butylene glycol, tetramethylene glycol, neopentyl glycol, 2-methyl-1,3-pentanediol, 1,5-pentanediol, hexamethylene glycol, xylylene glycol, etc. Preferably, one employs an alkanediol of the general formula $HO(CH_2)_n OH$ where $n=2-5$ or isomers thereof wherein the alkane group is branched and/or the hydroxy groups are not terminal. The preferred glycol is ethylene glycol.

The polyols used in the preparation of the polyesters of this invention can be widely varied and are those containing at least three esterifiable hydroxyl groups. In general, these are the polyhydric alcohols conventionally employed in preparing polyesters. Illustrative examples of such alcohols are glycerol, polyglycerol, pentaerthritol, mannitol, trimethylopropane, trimetholethane, 1,2,6-hexanetriol, polypentaerythritol, polyallyl alcohol, polymethallyl alcohol, polyols formed by the condensation of bisphenols with epichlorohydrin, and the like.

Preferred polyhydric alcohols to be used in the preparation of these polyesters are the aliphatic alcohols possessing from 3 to 6 hydroxyl groups and containing from 3 to 14 carbon atoms, such as glycerol, pentaerythritol, mannitol, 1,4,6-octanetriol, 1,3,5-hexanetriol and 1,5,10-dodecanetriol.

A variety of monocyclic aromatic polycarboxylic acids (i.e. having at least two carboxy groups) may be used in the copolymer of the present invention. Similarly, anhydrides, chlorides and esters of these acids are suitable. Preferred are the dicarboxylic acids and anhydrides, chlorides and esters thereof having the reactive groups in either the para or meta positions.

The acid, anhydride or ester is preferably utilized in the amount of about 5 percent to about 50 percent by weight of the final copolymer. Illustrative aromatic acids include phthalic acid, isophthalic acid, terephthalic acid, diphenic acid, hemimellitic acid, trimellitic acid, dichlorophthalic acid, etc.

Particularly preferred polycarboxylic acids are the aromatic dicarboxylic acids, containing from 6 to 10 carbon atoms wherein the two carboxyl groups are attached directly to the aromatic nucleus such as the phthalic acids, and preferably isophthalic acid, terephthalic acid mixtures of isophthalic acid and terephthalic acid and anhydrides, chlorides, and esters thereof.

In some cases it may be desirable to utilize other forms of the acids such as the acid anhydrides or acid chlorides, such as phthalic anhydride or trimellitic anhydride.

The esters of the polybasic acids may be produced by an ester-exchange reaction. Preferred derivatives to be used for this purpose comprise the esters of the above-described acids and the lower saturated monohydric alcohols, preferably those alcohols containing from 1 to 5 carbon atoms, such as methyl alcohol, ethyl alcohol, propyl alcohol, butyl alcohol and amyl alcohol.

Examples of other suitable materials include trimellitic anhydride; pyromellitic acid dianhydride; a benzophenone dicarboxylic acid such as benzophenone-4,4'dicarboxylic acid, 3,3', 4,4'-benzophenone tetracarboxylic dianhydride; dimethylterephthalate dimethylisophthalate, terephthaloyl chloride; isophthaloyl chloride, and 1,1,3, trimethyl -5-carboxy-3-(p-carboxyphenyl)indan. In addition, polycarboxylic aliphatic acids such as adipic acid, maleic acid, glutaric acid, succinic acid, etc. may be used.

Preferably, when the resin composition is used as an enamel for wire, metal drier in an amount of 0.2 to 1.0% metal based on total solids is used. Typical metal driers include the zinc, lead, calcium or cadmium linoleates, octoates and resinates of each of the metals. For example, zinc resinate, cadmium resinate, lead linoleate, calcium linoleate, zinc naphthenate, lead naphthenate, calcium naphthenate, cadmium naphthenate, zinc ocotoate and cadmium octoate may be used. Polyvalent metal driers such as manganese and cobalt naphthenate can also be employed. A teraalkyl titanate can be used in small amounts, i.e. 0.001 to 4.0 percent by weight titanium metal of the total solids, in place of the metal drier. Typical titanates are tetraisopropyl titanate, tetrabutyl titanate, tetrahexyl titanate, tetraoctyl titanate, tetramethyl titanate, etc.

When used as a wire enamel, the resin is to be diluted with a suitable solvent such as cresylic acid. The individual cresols present in the acid can also be used but it is preferred to use a commercial available cresylic acid mixture. It is also frequently desirable to dilute the cresylic acid with an aromatic hydrocarbon such as coal tar, petroleum naphtha, xylene etc.

The present invention is further described by the following examples wherein there is illustrated wire coatings with good heat aging properties which are less expensive than the traditional THEIC based resins. The resins contain an organo silicon compound only for the purposes of dry lubricity.

EXAMPLE 1

To a reaction vessel equipped with a condenser, stirring rod, and gas inlet tube, the following materials were added in the proportions indicated:

| | Parts by Weight |
|---|---|
| Dimethylterephthalate | 250.0 |
| Tris(2-hydroxethyl)isocyanurate (THEIC) | 250.0 |
| 1,3-dihydroxdiethyl 5,5' dimethyl hydentoin* | 25.0 |
| Diphenyl silanediol | 3.3 |

In this example and the subsequent examples the 1,3-dihydroxydiethyl 5,5' dimethyl hydantoin actually includes a solution of 84-85% by weight

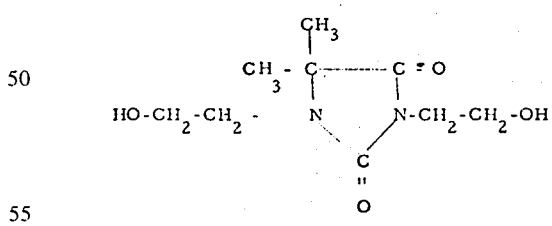

and 15-16 percent by weight

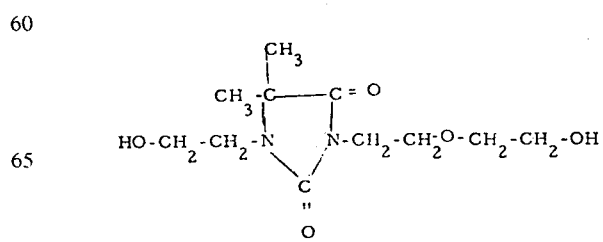

Substantially pure 1,3-dihydroxydiethyl 5,5' dimethyl hydantoin yields essentially the same results as this solution. The temperature was raised rapidly to 120°C, whereupon 3.3 parts of litharage were added with 100 parts of xylene. The temperature was held at 135°C for 2-6 hours. Nitrogen was used as a purge to remove xylene and other small fractions. The temperature was then allowed to rise to 220°–240°C and when the viscosity reached a clear hard pill stage the mass was quenched with cresylic acid.

The above polymer was diluted using a solvent ratio of 60 parts cresylic acid and 40 parts of aromatic hydrocarbon solvent. The enamel was placed on 18 gauge copper magnet wire. The coated wire had good Class 180°C NEMA properties.

EXAMPLE 2

Following the procedure set forth in Example 1, the following formula was prepared:

| | Parts by Weight |
|---|---|
| Dimethylterephthalate | 350.0 |
| Tris(2-hydroxyethyl)isocyanurate (THEIC) | 250.0 |
| 1,3-dihydroxydiethyl 5,5' dimethyl hydantoin | 108.0 |
| Trimethylolpropane | 16.0 |
| Diphenylsilanediol | 3.9 |
| Litharge (as alcoholysis catalyst) | 0.9 |
| Xylene (as azeotrope) | 100.0 |

The resulting polymer was applied to wire as a base coat and topcoated with an amide-imide resin. The resultant wire passed all tests for NEMA Class 180°C.

EXAMPLE 3

Following the general procedure set forth in Example 1, the following formulation was prepared:

| | Parts by Weight |
|---|---|
| Ethylene glycol | 8.26 |
| 1,3-dihydroxyethyl-5,5' dimethyl hydantoin | 16.52 |
| Terephthalic acid | 32.57 |
| Isophthalic acid | 6.88 |
| Tris(2-hydroxyethyl)isocyanurate (THEIC) | 26.61 |
| Diphenysilanediol | 0.60 |
| Tetraoctyl titanate | 0.20 |
| Cresylic acid | 8.26 |

The reaction temperature was allowed to rise to 210°–240°C. over a period of 4 to 12 hours. The resultant polymer was then diluted using a solvent ratio of 70 parts cresylic acid and 30 parts of aromatic hydrocarbon solvent to form a wire enamel. This enamel was cured on AWG 18 copper wire. Improvements in cut through temperature and burnout resistance were observed. A tabulation of the properties of the enamel both with and without a nylon topcoat is presented in Table 1.

EXAMPLE 4

Following the general procedure set forth in Example 1, the following formula was prepared:

| | Parts by Weight |
|---|---|
| Isophthalic acid | 113 |
| Terephthalic acid | 529 |
| Tris(2-hydroxyethyl)isocyanurate (THEIC) | 216 |
| Glycerin | 76 |
| Ethylene glycol | 237 |
| Diphenyl silanediol | 10 |
| Tetraoctyl titanate | 3 |

The reaction temperature was allowed to rise to 210–245°C. over a period of 6 to 16 hours. The resultant polymer was then diluted using a solvent ratio of 70 parts cresylic acid and 30 parts of aromatic hydrocarbon solvent to form a wire enamel. The enamel was cured on AWG 18 copper wire. A tabulation of the properties of this enamel, prepared without a hydantoin component, and with a nylon topcoat, is presented in Table 1.

EXAMPLE 5

Following the general procedure set forth in Example 1, the following formula was prepared:

| | Parts by Weight |
|---|---|
| Isophthalic acid | 113 |
| Terephthalic acid | 529 |
| Trishydroxyethylisocyanurate | 216 |
| Glycerine | 76 |
| Ethylene glycol | 159 |
| 1,3-dihydroxyethyl-5,5'-dimethyl hydantoin | 270 |
| Diphenyl silanediol | 9.9 |
| Tetraoctyl titanate | 1.5 |

The temperature of the reaction was allowed to rise to 220°C. over a period of 9 to 18 hours. The polymer was then diluted using a solvent ratio of 70 parts cresylic acid and 30 parts of aromatic hydrocarbon solvent to form a wire enamel. The enamel was then cured on AWG 18 copper wire. The properties of the enamel with and without a nylon topcoat, are tabulated in Table 1. In comparison to the enamel of Example 4, an improvement in heat shock (450°C.), dielectric strength (500 volts/mil) and burnout resistance (50 seconds) were observed. Accordingly, a comparison of Examples 3 and 5 with Example 4 clearly shows the beneficial properties produced by a reactive hydantoin in the THEIC based resin. Similar results are obtained with other hydantoin based compounds having, for example, reactive -H, -COOH, alkoxy, —NH$_2$ groups and the like.

EXAMPLE 6

Following the general procedure of Example 1 part of the terephthalic acid was replaced with a hydantoin acid as follows:

| | Parts by Weight |
|---|---|
| Terephthalic acid | 109 |
| 1,3 Dicarboxyethyl-5,5'-dimethyl hydantoin | 178 |
| Trishydroxyethylisocyanurate | 146 |
| 1,3-dihydroxyethyl 5,5'dimethyl hydantoin | 91 |
| Ethylene glycol | 45 |
| Diphenyl silanediol | 3.2 |
| TOT | 1.0 |

The reaction was allowed to proceed in a manner similar to previous enamels. The resultant enamel showed improvements in unilateral and emersion scrape abrasion and heat shock properties. The properties of the enamel with and without a nylon topcoat are tabulated in Table 1.

Table I

| | EXAMPLE 3 | | EXAMPLE 4 | | EXAMPLE 5 | | EXAMPLE 6 | |
|---|---|---|---|---|---|---|---|---|
| | with topcoat IX | without topcoat IX | with topcoat IX | without topcoat IX | with topcoat IX | without topcoat IX | with topcoat IX | without topcoat IX |
| Snap +X | 1870 | 1800 | 2000 | 1800 | 1300 | 2000 | 1670 | |
| Dielectric (volts/mil) | 3250 | 3300 | 2800 | 3300 | 3300 | 2900 | 2300 | |
| Heat Shock (°C) | 200 | 140 | 175 fail | 210 | 120 | 250 | 140 | |
| Cut through | 275 | 370 | 260 | 275 | 320 | 260 | 300 | |
| Emersion scrape (lbs) | 32 | 24 | 22 | 23 | 12 | 30 | 28 | |
| Burnout resistance (sec) | 500 | 454 | 417 | 467 | 425 | 450 | | |

What is claimed is:

1. An electrical conductor having a first coating of a resin composition having hydantoin and isocyanurate radicals in the polymer backbone which comprises the reaction product of:
   a. a monomeric hydantoin compound having the structural formula

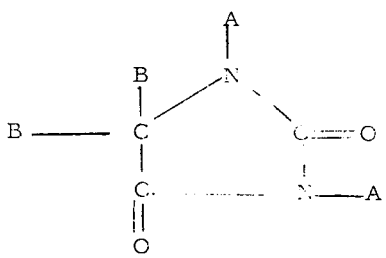

wherein A is H, OH; ROH; COOH; RCOOOH; $NH_2$; $RNH_2$; $(OR)_x$ OH wherein R is $(CH_2)_y$, $y$ is 1-5, and x is an integer in the range of 1 to 10; or, $R_1$—O—$R_2$ wherein $R_1$ and $R_2$ are $C_1$—$C_5$ alkyl groups; and, B is H, OH, ROH, COOH, RCOOH, $NH_2$, $RNH_2$, or a $C_1$ —$C_{10}$ alkyl group, or dimers or trimers of said monomeric hydantoin compound;
   b. an aromatic carboxylic acid having at least two carboxy groups or an anhydride, ester, or chloride of said acid; and,
   c. tris (2-hydroxyethyl)isocyanurate, as a polyhydric alcohol component;
   d. said reaction effected at a temperature of about 150°C to about 280°C, and, a second nylon topcoat over said first coating.

2. An electrical conductor as in claim 1 wherein up to 50 equivalent percent of the isocyanurate in said resin composition is replaced by another polyhydric alcohol.

3. An electrical conductor as in claim 2 wherein said another polyhydric alcohol is ethylene glycol.

4. An electrical conductor as in claim 1 wherein the carboxylic acid of said resin composition is terephthalic acid, isophthalic acid or a mixture of terephthalic acid and isophthalic acid.

5. An electrical conductor as in claim 1 wherein the hydantoin compound of said resin composition is 1,3-dihydroxyethyl -5,5'-dimethyl hydantoin.

6. An electrical conductor as in claim 1 wherein said resin composition includes a tetraalkyl titanate.

7. An electrical conductor as in claim 1 wherein said resin composition comprises about 5-50 percent by weight of said hydantoin compound; about 5-50 percent by weight of terephthalic acid, isophthalic acid or an anhydride, ester or chloride of said acid; and, about 5-50 percent by weight tris (2-hydroxyethyl)isocyanurate.

8. An electrical conductor as in claim 7 wherein said hydantoin compound is 1,3-dihydroxyethyl-5,5'-dimethyl hydantoin.

* * * * *